United States Patent [19]

Mezzedimi et al.

[11] Patent Number: 4,976,585
[45] Date of Patent: Dec. 11, 1990

[54] SYSTEM FOR THE RAPID BALANCING OF REVOLVING SHAFTS, PARTICULARLY SUITABLE FOR GAS TURBINES

[75] Inventors: Vasco Mezzedimi, Poggibonsi; Franco Frosini, Sesto Fiorentino, both of Italy

[73] Assignee: Nuovopignone-Industrie Meccaniche e Fonderia S.p.A., Florence, Italy

[21] Appl. No.: 332,546

[22] Filed: Apr. 3, 1989

[30] Foreign Application Priority Data

Apr. 8, 1988 [IT] Italy ................... 20129 A/88

[51] Int. Cl.$^5$ ............................................. F01D 25/00
[52] U.S. Cl. ...................... 415/118; 415/201; 74/573 R; 81/452; 279/23 R; 279/24; 279/80; 403/289; 403/341
[58] Field of Search ............ 415/118, 119, 201; 416/144; 73/468; 74/574, 573 R, 572; 403/341, 286, 289, 290; 81/451, 452; 279/1 SG, 23 R, 24, 29, 46 R, 80, 79; 60/39, 33

[56] References Cited

U.S. PATENT DOCUMENTS

| 881,298 | 3/1908 | Chappel | 81/452 |
| 2,954,809 | 10/1960 | Loewy | 81/452 |
| 3,985,465 | 10/1976 | Sheldon et al. | 415/201 |
| 4,386,498 | 6/1983 | Lee et al. | 415/118 |
| 4,856,964 | 8/1989 | Stock | 415/201 |

FOREIGN PATENT DOCUMENTS

| 1426809 | 4/1969 | Fed. Rep. of Germany | 415/118 |
| 121306 | 9/1979 | Japan | 415/118 |
| 785556 | 12/1980 | U.S.S.R. | 415/118 |
| 1116221 | 9/1984 | U.S.S.R. | 415/118 |
| 352371 | 7/1931 | United Kingdom | 415/201 |
| 2033973 | 5/1980 | United Kingdom | 415/201 |

Primary Examiner—John T. Kwon
Attorney, Agent, or Firm—Hedman, Gibson, Costigan & Hoare

[57] ABSTRACT

A system for the rapid balancing of revolving shafts, in particular, the revolving shaft of a gas turbine. The system comprises two mutually adjacent bores provided in the stator of the turbine, which can be closed by relevant plugs, and which are collimated on the screw-threaded bores of the rotor. The system also comprises a special rigid rod for elastically holding a screw-threaded balancing mass, and for causing it to rotate.

3 Claims, 2 Drawing Sheets

SYSTEM FOR THE RAPID BALANCING OF REVOLVING SHAFTS, PARTICULARLY SUITABLE FOR GAS TURBINES

The present invention relates to a system which makes it possible a revolving shaft, in particular the revolving shaft of a gas turbine, to be balanced in a rapid, comfortable and efficacious way, with no need for the stator of the turbine having to be dismantled.

It is well known that in a gas turbine, as, on the other hand, in all turbomachines, such as pumps, compressors, and so forth, the need arises often for the balancing of the revolving shaft to be restored, owing to the occurring of harmful vibrations caused by unbalances.

In an industrial turbine, the above said unbalances can be generated by many causes, such as phenomena of localised erosion, phenomena of creep, beddings in the couplings between several revolving parts variously connected with each other, and are generally removed by means of a balancing operation, consisting in dismantling the rotor from the turbine and balancing it on a suitable balancing machine.

Inasmuch as such an operation unfortunately results to be extremely complex, long, and therefore expensive, in that it requires that in practice the whole machine be dismantled, the procedure is preferred at present, which consists in leaving the rotor installed inside the same turbine, and balancing it with the preliminary addition of unbalancing tests masses, and the subsequent addition of additional balancing masses suitably mounted on the same rotor, while this latter is made revolve inside the turbine. For such purpose, and inasmuch as the fastening on the rotor of the above said masses should be carried out at well-determined positions in order to achieve the intended result, the rotor is already provided, along a specific circumferential region thereof, with a plurality of screw-threaded bores inside which said balancing masses can be housed and tightened.

But also this process known from the prior art suffers from considerable drawbacks and furthermore results to be considerably burdensome, in that it involves the handling of high-weight and very cumbersome parts. In fact, the application to the rotor of said test masses and of said balancing masses can only be carried out by dismantling at least one portion of the external stator of the turbine, until the same rotor is made accessible. On the other hand, said application results to be rather difficult, in that it has to be carried out under conditions of very limited room, and of reduced visibility, in that the operator has to work on parts situated very deeply inside the structure of the turbine, and which are moreover covered by the hot-gas container organs.

To the above, the not remote risk has then to be added of a possible fortuitous falling, during the handling or the fastening, of one or more of these masses inside the machine, with the need consequently arising for the machine to be opened in order to recover them.

The purpose of the present invention is namely of obviating the above-said drawbacks and of hence providing a system which makes it possible a rapid balancing to be carried out of a revolving shaft, in particular of the revolving shaft of a gas turbine, by means of the application to the rotor installed on said shaft of screw-threaded test masses and of the end screw-threaded balancing mass, with no parts of the machine having to be dismantled.

This purpose is substantially achieved thanks to the fact that on a suitable wall of the external stator of the turbine two mutually adjacent bores, which can be closed by means of relevant plugs, are provided, which are so orientated as to collimate, through the inner chamber of the duct which feeds the turbine with the hot gases, on the circumferential region of the turbine in which the plurality of screw-threaded bores are provided in order to house the balancing masses, with one of said bores being destined to house a light source suitable for rendering visible the screw-threaded bores provided in said region of the rotor, and the other bore is destined first to the visual collimation of a specific rotor screw-threaded bore by means of the suitable rotation of the same rotor, and then to the introduction and the fastening inside said collimated screw-threaded bore of a screw-threaded balancing mass which is handled for the intended purpose with a rigid rod provided with a head with edges which gets engaged inside a corresponding inner groove of the above said screw-threaded balancing mass.

Said balancing mass is then elastically hold by said rod by means of a sleeve which, by being screwed on the end of the same rod, is provided with protruding jaws which elastically enter a peripheral groove provided at the lower end of the same balancing mass.

The invention is better clarified now by referring to the hereto attached drawings which illustrate a preferred form of practical embodiment supplied for merely exemplifying, non-limitative, purposes, in that technical and structural variants may be supplied at any time, without departing from the scope of the present invention.

Figure 1:
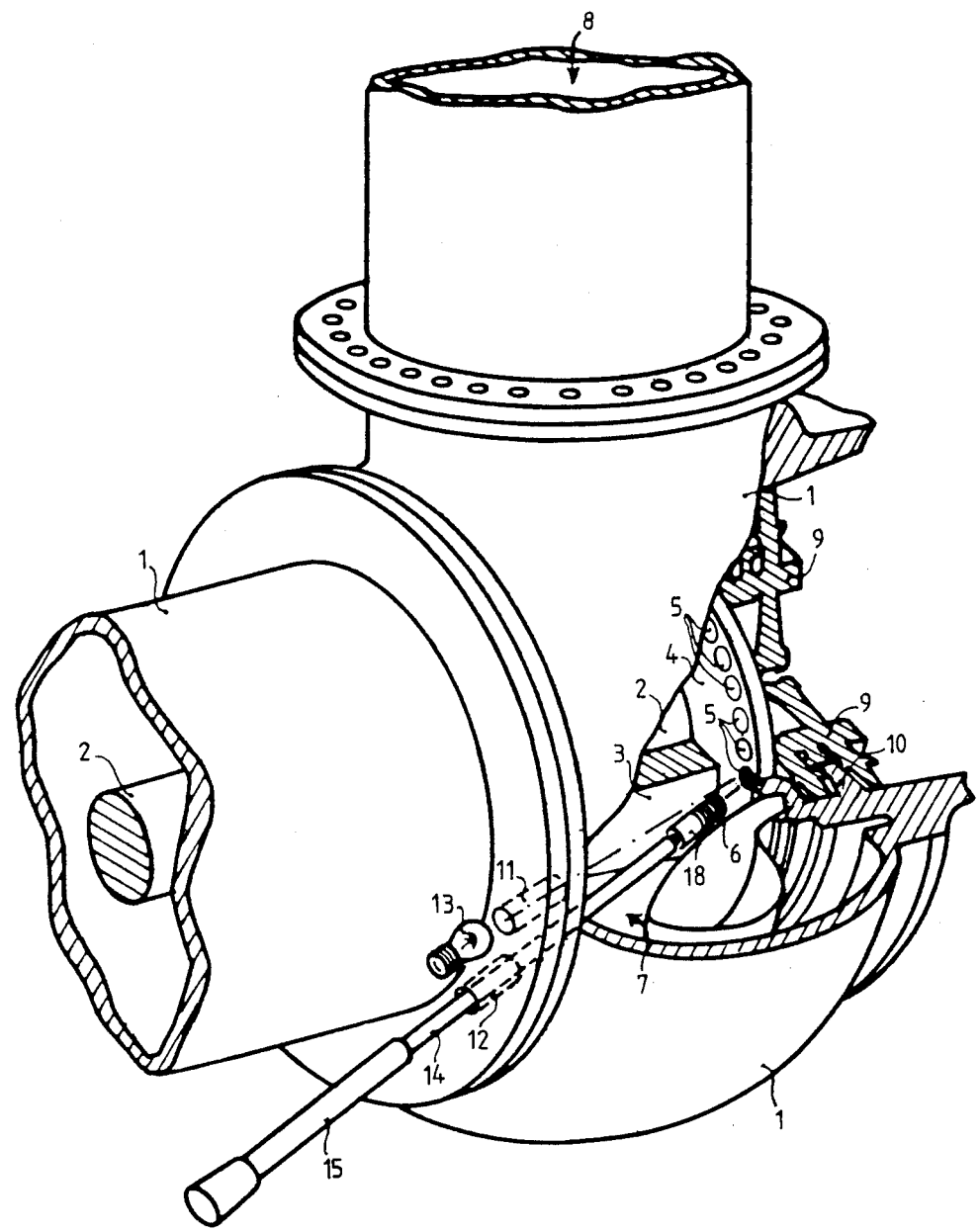
FIG. 1 shows a partial perspective, partially sectional view of a gas turbine in which the balancing system according to the present invention is adopted.
Figure 2:
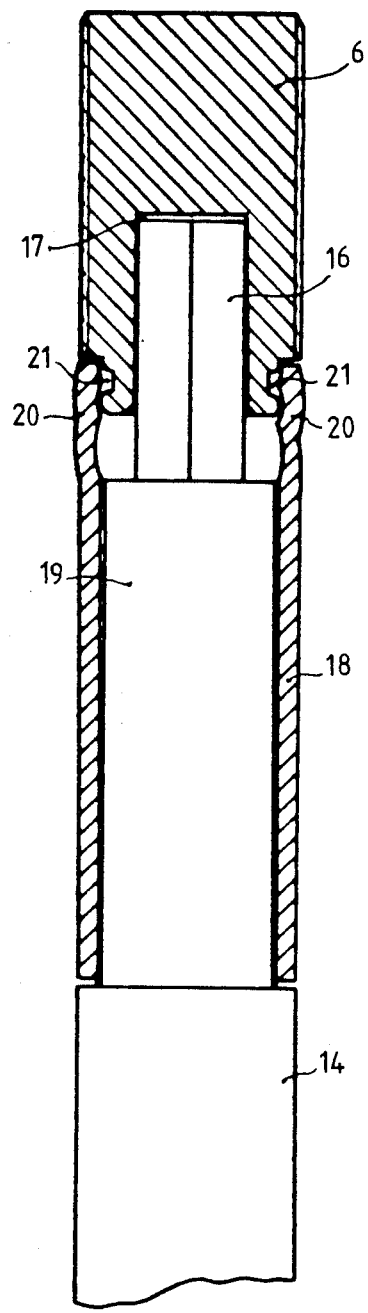
FIG. 2 shows a partially sectional, enlarged-scale front view of a detail of the balancing system of FIG. 1.

Referring to the figures, by the reference numeral 1 the outer stator of a gas turbine is shown, the shaft 2 of which is supported by bearings 3, and ends with the rotor 4, provided, along its peripheral circumferential region, with a plurality of screw-threaded bores 5 inside which threaded balancing masses 6 can be housed and tightened.

Said rotor 4 is situated between the chamber 7 of the feed duct which feeds the turbine with the hot cases coming from the combustion chamber 8, and the blades, i.e., the rotor blades 9 and the stator blades 10, of the turbine.

In order to render said screw-threaded bores 5 of the rotor 4 accessible from the outside for the purpose of carrying out the balancing of the shaft, according to the invention two mutually adjaced bores are provided through the wall of the stator 1 which is opposite to the blades 9, 10, which bores can be closed by means of suitable plugs and are respectiely indicated by the reference numerals 11 and 12. Said bores 11 and 12 are so orientated as to collimate on one of said bores 5, through said chamber 7 of the hot gases feed duct.

The bore 11 houses a light source 13 suitable for lighting up the above said collimation point, and the bore 12 is used first as a peep-hole in order to collimate, by rotating the rotor 4, a specific screwthreaded bore 5 inside which the balancing mass has to be inserted, and then in order to introduce into the stator 1 the above said balancing mass 6.

The above said introduction of the mass 6 is carried out with a rigid rod 14 which is also used in order to tighten said mass 6 inside the selected screw-threaded bore.

Said rod 14, provided with a handle 15 is provided with a head with edges 16 which, by entering a corresponding internal groove 17 provided in the mass 6, renders said mass integral with the rod as regards the rotation of the rod around its own axis, what makes it possible the mass 6 to be easily screwed down and tightened inside the selected screw-threaded bore 5.

On the other hand, in order to prevent an accidental falling of the balancing mass 6 inside the machine during its handling, said mass 6 is elastically hold, and is hence made integral with said rod as regards the axial shifts, by means of a sleeve 18 which is screwed onto the end 19 of the rod 14, with the protruding jaws 20 of said sleeve 18 entering a peripheral groove 21 provided at the lower end of the balancing mass 6.

Therefore, it is evident that in order to disengage the mass 6 from the rod 14, it is enough to pull the same rod with a high enough force in order to cause its jaws to be disengaged.

We claim:

1. A turbine having a stator and a rotating shaft within the stator, wherein the shaft can be balanced within the stator of the turbine without dismantling the turbine, by selectively applying masses to the shaft, comprising a rotor attached to the shaft having a plurality of threaded bores around a circumferential region of said rotor for housing the masses, wherein the masses are complimentarily threaded for mating with said threaded bores and wherein a wall of the turbine has a first bore and a second bore wherein said first and second bores are mutually adjacent and have axes which focus upon one of said threaded bores of said rotor, wherein said first bore in said wall of the turbine is adapted to house a light source for illuminating said one of said threaded bores of said rotor and said second bore in said wall of the turbine is adapted for aligning said one of said threaded bores of said rotor with said second bore in said wall of the turbine for introducing a threaded mass attachment means for attaching said threaded mass in said threaded bore of said rotor for balancing the shaft, and wherein said turbine includes a first plug and a second plug adapted for sealing said first and said second bores in said wall of the turbine respectively after the shaft has been balanced and the mass attachment means has been removed.

2. The turbine of claim 1, wherein said threaded mass has an inner groove and a peripheral groove and said mass attachment means comprises a rigid rod having a head end, wherein said head end includes edges adapted to engage with the inner groove of the threaded mass; and a sleeve screwed on said head end of said rod wherein said sleeve has protruding jaws adapted to engage said peripheral groove of said threaded mass, so that said mass attachment means screws and secures said threaded mass into said threaded bores of said rotor to balance the shaft of the turbine.

3. In a turbine having a stator and a rotating shaft wherein the rotating shaft has a rotor which rotates within the stator, a method of balancing the shaft without dismantling the turbine by selectively applying masses to the rotor, wherein the rotor has a plurality of threaded bores around a circumferential region thereof for housing the masses, and the turbine has a wall which has a first bore and a second bore which are mutually adjacent and which have axes which focus upon one of the threaded bores of the rotor, and wherein the turbine has a first plug and a second plug for sealing the first and second bores in the wall of the turbine respectively, the method comprising:
  (a) removing the first and second plugs from the first and second bores in the wall of the turbine;
  (b) inserting a light source in the first bore in the wall of the turbine for illuminating at least one of the threaded bores of the rotor;
  (c) aligning one of the threaded bores of the rotor with the second bore in the wall of the turbine;
  (d) inserting a mass attachment means through said second bore in the wall of the turbine for selectively applying a mass to said one of said threaded bores of the rotor to balance the shaft, wherein the mass has complimentary threads for mating with the threaded bore of the rotor; and
  (e) removing the light source from the first bore in the wall of the turbine and removing the mass attachment means from the second bore in the wall of the turbine and resealing the first and second bores in the wall of the turbine with the first and second plugs, respectively.

* * * * *